United States Patent
Nguyen et al.

(10) Patent No.: US 12,490,977 B2
(45) Date of Patent: Dec. 9, 2025

(54) SUTURE CONSTRUCT

(71) Applicant: Biomet Manufacturing, LLC, Warsaw, IN (US)

(72) Inventors: Hoang Nguyen, Litchfield Park, AZ (US); Nathan A. Winslow, Scottsdale, AZ (US)

(73) Assignee: Biomet Manufacturing, LLC, Warsaw, IN (US)

( * ) Notice: Subject to any disclaimer, the term of this patent is extended or adjusted under 35 U.S.C. 154(b) by 139 days.

(21) Appl. No.: 18/279,551

(22) PCT Filed: Mar. 16, 2022

(86) PCT No.: PCT/US2022/020612
§ 371 (c)(1),
(2) Date: Aug. 30, 2023

(87) PCT Pub. No.: WO2022/216424
PCT Pub. Date: Oct. 13, 2022

(65) Prior Publication Data
US 2024/0148375 A1 May 9, 2024

Related U.S. Application Data

(60) Provisional application No. 63/170,760, filed on Apr. 5, 2021.

(51) Int. Cl.
*A61B 17/06* (2006.01)
*A61B 17/04* (2006.01)

(52) U.S. Cl.
CPC .... *A61B 17/06166* (2013.01); *A61B 17/0485* (2013.01); *A61B 2017/06176* (2013.01); *A61B 2017/06185* (2013.01)

(58) Field of Classification Search
CPC .... A61B 17/06166; A61B 2017/06185; A61B 17/0485; A61B 2017/06176
See application file for complete search history.

(56) References Cited

U.S. PATENT DOCUMENTS

| 5,628,756 A | 5/1997 | Barker, Jr. et al. |
| 2007/0027475 A1 | 2/2007 | Pagedas |

(Continued)

FOREIGN PATENT DOCUMENTS

| CN | 107374684 B | 8/2019 |
| JP | 2020523112 | 8/2020 |

(Continued)

OTHER PUBLICATIONS

"Canadian Application Serial No. 3,215,742, Response filed Jul. 3, 2025 to Office Action mailed Mar. 24, 2025", 24 pgs.

(Continued)

*Primary Examiner* — Katherine Shi
(74) *Attorney, Agent, or Firm* — SCHWEGMAN LUNDBERG & WOESSNER, P.A.

(57) ABSTRACT

Disclosed herein is a suture for a surgical procedure that can include a body. The body can comprise an elongate strand. The body can have an aperture therethrough at a first portion of the elongate strand. A second portion of the elongate strand adjacent the first portion can be passed through the first aperture to create a feature along an exterior surface of the body.

11 Claims, 10 Drawing Sheets

(56) References Cited

U.S. PATENT DOCUMENTS

| | | | |
|---|---|---|---|
| 2010/0217315 A1 | 8/2010 | Jolly et al. | |
| 2011/0208239 A1* | 8/2011 | Stone | A61B 17/06004 606/228 |
| 2018/0353167 A1 | 12/2018 | Lombardo et al. | |
| 2019/0099258 A1 | 4/2019 | Armington et al. | |
| 2020/0360009 A1 | 11/2020 | Lombardo et al. | |

FOREIGN PATENT DOCUMENTS

| | | |
|---|---|---|
| JP | 7650368 | 3/2025 |
| WO | 2020018773 | 1/2020 |
| WO | WO-2022216424 A1 | 10/2022 |

OTHER PUBLICATIONS

"European Application Serial No. 22714709.7, Response filed May 23, 2025 to Communication Pursuant to Article 94(3) EPC mailed Feb. 24, 2025", 33 pgs.

"International Application Serial No. PCT/US2022/020612, International Search Report mailed Jul. 5, 2022", 5 pgs.

"International Application Serial No. PCT/US2022/020612, Written Opinion mailed Jul. 5, 2022", 8 pgs.

"International Application Serial No. PCT US2022 020612, International Preliminary Report on Patentability mailed Oct. 19, 2023", 10 pgs.

"European Application Serial No. 22714709.7, Communication Pursuant to Article 94(3) EPC mailed Aug. 14, 2024", 4 pgs.

"European Application Serial No. 22714709.7, Response filed May 14, 2024 to Communication pursuant to Rules 161(1) and 162 EPC mailed Nov. 14, 2023", 19 pgs.

"Australian Application Serial No. 2022254936, First Examination Report mailed Aug. 26, 2024", 8 pgs.

"Japanese Application Serial No. 2023-561187, Notification of Reasons for Refusal mailed Aug. 6, 2024", w English translation, 7 pgs.

"Australian Application Serial No. 2022254936, Response Filed Oct. 18, 2024 to First Examination Report mailed Aug. 26, 2024", 36 pgs.

"Australian Application Serial No. 2022254936, Subsequent Examination Report mailed Nov. 6, 2024", 9 pgs.

"Japanese Application Serial No. 2023-561187, Response filed Oct. 24, 2024 to Notification of Reasons for Refusal mailed Aug. 6, 2024", W English Claims, 9 pgs.

"European Application Serial No. 22714709.7, Response filed Nov. 28, 2024 to Communication Pursuant to Article 94(3) EPC mailed Aug. 14, 2024", 10 pgs.

"Japanese Application Serial No. 2023-561187, Notification of Reasons for Refusal mailed Nov. 5, 2024", w English translation, 6 pgs.

"Australian Application Serial No. 2022254936, Response filed Jan. 15, 2025 to Subsequent Examination Report mailed Nov. 6, 2024", 13 pgs.

"European Application Serial No. 22714709.7, Voluntary Amendment filed Jan. 17, 2025", 9 pgs.

"Australian Application Serial No. 2022254936, Subsequent Examiners Report mailed Feb. 11, 2025", 5 pgs.

"Japanese Application Serial No. 2023-561187, Response filed Jan. 28, 2025 to Notification of Reasons for Refusal mailed Nov. 5, 2024", W English Claims, 6 pgs.

"European Application Serial No. 22714709.7, Communication Pursuant to Article 94(3) EPC mailed Feb. 24, 2025", 5 pgs.

"Canadian Application Serial No. 3,215,742, Office Action mailed Mar. 24, 2025", 5 pgs.

"Canadian Application Serial No. 3,215,742. Voluntary Amendment filed Jul. 10, 2025", 4 pgs.

\* cited by examiner

FIG. 12 to be this point or to replace the tendon itself,
SUTURE CONSTRUCT

CLAIM OF PRIORITY

This application is a U.S. National Stage Application under 35 U.S.C. 371 from International Application Serial No. PCT/US2022/020612, filed on Mar. 16, 2022, and published as WO 2022/216424 A1 on Oct. 13, 2022, which claims the benefit of U.S. Provisional Patent Application Ser. No. 63/170,760, filed on Apr. 5, 2021, the benefit of priority of each of which is claimed hereby, and each of which is incorporated by reference herein in its entirety.

FIELD OF THE DISCLOSURE

The present subject matter relates to surgical procedures and devices and, more particularly, to prostheses, methods and systems related to soft tissue repair.

BACKGROUND

The successful reattachment of soft tissue to other tissue and/or bone can be a significant concern, especially in the sports medicine industry. Soft tissues are often fixed to various positions on the bone. For example, to replace a natural tendon fixation point or to replace the tendon itself, fixing a graft to a selected bone area may be desired. Thus, one means to fix a soft tissue to the selected area is to provide a suture through a selected portion of the soft tissue and fix the other end of the suture to a selected area on the bone with anchor(s) and/or tack(s).

SUMMARY

To better illustrate the apparatuses, systems and methods disclosed herein, a non-limiting list of examples is provided here:

Example 1 is a suture for a surgical procedure that can include a body. The body can comprise an elongate strand. The body can have an aperture therethrough at a first portion of the elongate strand. A second portion of the elongate strand adjacent the first portion can be passed through the first aperture to create a feature along an exterior surface of the body.

Example 2 is the suture of Example 1, wherein optionally the body has at least a second aperture therethrough at a third portion of the elongate strand. The third portion can be spaced longitudinally along the elongate strand from the second portion, and a fourth portion of the elongate strand adjacent the third portion can be passed through the at least the second aperture to create at least a second feature along the exterior surface of the body.

Example 3 is the suture of any one or combination of Examples 1-2, wherein optionally the feature comprises a ridge along the exterior surface of the body.

Example 4 is the suture of any one or combination of Examples 1-3, wherein optionally the second portion is folded over and passed through at least a part of the first portion.

Example 5 is the suture of any one or combination of Examples 1-4, wherein optionally the body is formed of a plurality of braided strands that together form the elongate strand, and the exterior surface of the body is substantially flat.

Example 6 is the suture of any one or combination of Examples 1-5, further optionally comprising an element captured by the feature.

Example 7 is the suture of Example 6, wherein optionally the element comprises at least one of a knot, a bead, a surgical device or a second suture.

Example 8 is a system optionally comprising a suture and a needle. The suture can have a body formed of an elongate strand. The body can have an aperture therethrough at a first portion of the elongate strand. A second portion of the elongate strand adjacent the first portion can be configured to pass through the first aperture to create a feature along an exterior surface of the body. The needle can have a first end configured to puncture the suture to create the aperture and a second part having a snare loop, eye or other feature configured to capture the suture. The needle can be configured to pass through the aperture to pass the suture through the aperture.

Example 9 is the system of Example 8, optionally further comprising one or more elements configured to be coupled to the feature.

Example 10 is the system of Example 9, wherein optionally the one or more elements comprise at least one of a knot, a bead, a surgical device or a second suture.

Example 11 is the system of any one or combination of Examples 8-10, wherein optionally the body has a plurality of apertures in addition to the aperture, and wherein the suture is repeatedly passed through the plurality of apertures to form a plurality of features including the feature.

Example 12 is the system of any one or combination of Examples 8-11, wherein optionally the feature comprises a ridge along the exterior surface of the body.

Example 13 is the system of Examples 8-12, wherein optionally the second portion is folded over and passed through at least a part of the first portion.

Example 14 is a method of forming suture. The method can comprise a manufacture or surgical method. The method can include any one or combination of puncturing an elongate body of the suture to form an aperture therein, passing a portion of the elongate body through the aperture so as to form part of the elongate body into a loop, and reducing the loop to form a feature along an exterior surface of the body adjacent the aperture.

Example 15 is the method of Example 14, optionally further comprising creating a knot in the elongate body and capturing the knot within the loop with the reducing the loop.

Example 16 is the method of any one or combination of Examples 14-15, optionally further comprising capturing an element within the loop with the reducing of the loop.

Example 17 is the method of Example 16, optionally the element comprises at least one of a knot, a bead, a surgical device or a second suture.

Example 18 is the method of any one or combination of Examples 14-17, wherein passing the second portion of the elongate body through the aperture so as to form the elongate body into the loop includes capturing the suture in a snare loop, eye or other feature that is passed through the aperture.

In Example 19, the suture constructs, systems or methods of any one of or any combination of Examples 1-18 are optionally configured such that some or all elements or options recited are available to use or select from.

BRIEF DESCRIPTION OF THE FIGURES

The above-mentioned and other features and advantages of this disclosure, and the manner of attaining them, will become more apparent and the disclosure itself will be better understood by reference to the following description of embodiments taken in conjunction with the accompanying drawings, wherein.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Disclosed herein are methods, systems and devices that can facilitate a higher friction area on a suture and/or can facilitate a rapid connection of an element (a knot, another suture, a bead, and/or another surgical device) with the suture. For example, the systems and devices can facilitate the passage of part of the suture through an aperture created in the same suture. As a result of the suture being passed through itself, an initial loop is formed. This initial loop can be used for connection to the element or surgical device, for example. The initial loop can be reduced by drawing the suture through the aperture until the loop is closed (i.e., substantially eliminated) leaving a bump, ridge, projection or other feature along a surface of the suture. This surface feature can cause a higher friction area along the suture surface, and therefore, can be more inclined to contact, catch, grasp and/or hold soft tissue, for example. The surface feature can be helpful in creating a higher friction area so that the suture is less likely to slip against itself. Thus, the surface feature can decrease the likelihood of a slip of the suture, such as a suture knot slipping along a length of the suture. The surface feature can be helpful in coupling with tissue to facilitate coupling between the tissue and the suture. The size of the surface feature can be altered as desired by adding the element (e.g., the knot, the bead, etc.) to create a larger region along the suture of increased size for the feature. Multiple apertures and multiple passes of the suture through the aperture are contemplated to create regions of higher friction having multiple surface features along the longitudinal length of the suture.

The present inventors have recognized, among other things, that existing sutures can require a multiple step process for connection of the suture to tissue or for connection with another surgical device such as a suture anchor. This process can be challenging and time consuming. For example, currently known knotless suture anchor constructs typically rely on multiple components that must interact with one another precisely and in a reliable manner to facilitate anchoring of suture. Furthermore, sutures can have coatings or can be formed of materials) that do not facilitate adequate friction with tissue to cause desired coupling (e.g., catching/grasping) of the suture with tissue or with itself (hence, the suture can possibly slip as discussed previously).

Considering these and other factors, the present inventors propose sutures and related systems and methods that can provide for faster, easier, and more reproducible surgical techniques. The suture and related systems and methods can be constructed/performed with little additional components or complex techniques but by simply using an aperture through the suture and passing a part of that suture through the aperture and reducing the initial loop to create the feature. The suture, systems and methods disclosed herein can allow a surgeon to fasten suture to tissue or couple suture to a surgical device such as an anchor without tying a knot. Again, this can simplify surgical complexity.

Figure 1:
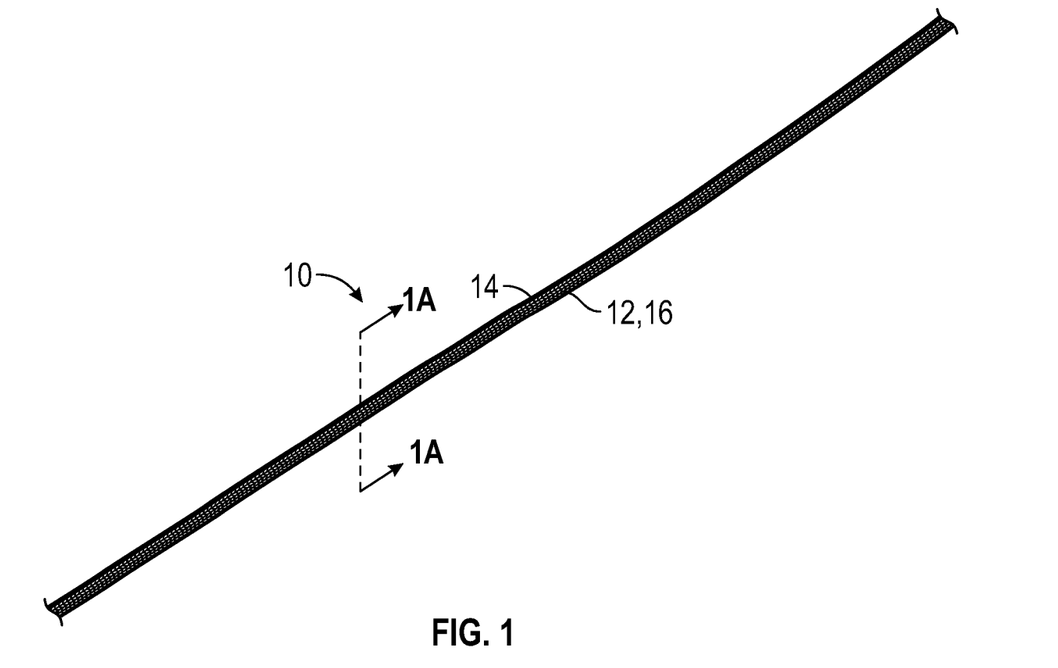
FIG. 1 illustrates a suture in accordance with at least one example of the present disclosure.
Figure 1A:
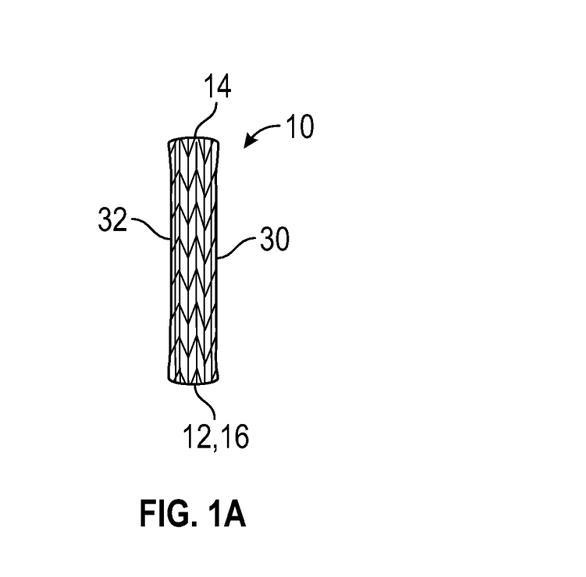
FIG. 1A is a cross-section view of the suture of FIG. 1.

Turning now to the figures, FIGS. 1 and 1A shows a surgical suture 10 configured for connection to tissue. The suture 10 can include a body 12 having an exterior surface 14. The body 12 can comprise an elongate strand 16 having a longitudinal extent along a longitudinal axis LA. The elongate strand 16 can comprise a single strand or a plurality of strands. The plurality of strands can be woven, braided or otherwise interconnected.

The suture 10 can be any type of suture known in the art. Thus, the suture 10 can comprise a multi-strand or mono-strand suture. The suture 10 can be braided or non-braided. The suture 10 can have any shape such as round, flat, broad band, tape, ribbon, etc. The suture 10 can be constructed of any material as known in the art. Examples of suitable sutures include, but are not limited to, ZipLoopm™, Broad-Band™, MaxBraid, TRU-Link and ExpressBraid™ sutures of Zimmer Biomet, Inc. The suture 10 can be formed of various materials such as but not limited to ultra-high-molecular weight polyethylene, other types of polyethylene, Nylon, etc., for example.

FIGS. 1 and 1A show the suture 10 is a ribbon or band type suture formed of a plurality of braids and can be flat and broad rather than round. However, round suture is also contemplated as benefiting from the constructs and techniques discussed herein. Due to the ribbon or band type configuration shown, the suture 10 can have a first side 30 that is substantially flat and an opposing second side 32 that is substantially flat as shown in FIG. 1A. The first side 30 and the second side 32 can extend generally parallel with one another.

Figure 2:
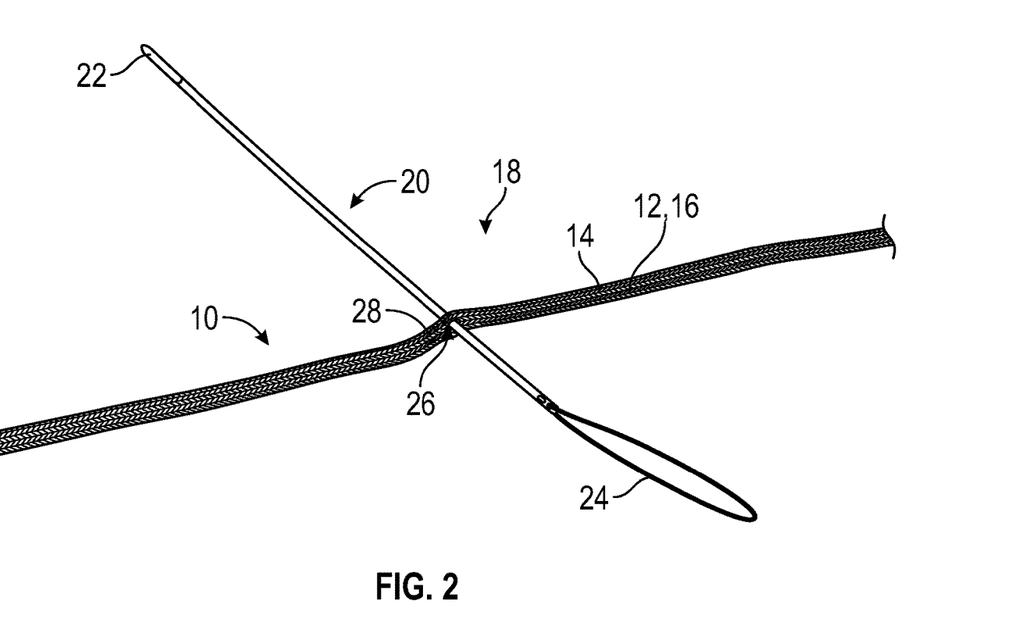
FIG. 2 is an enlarged view of a part of the suture of FIG. 1 being pierced by a needle according one example of the present disclosure.
Figure 2A:
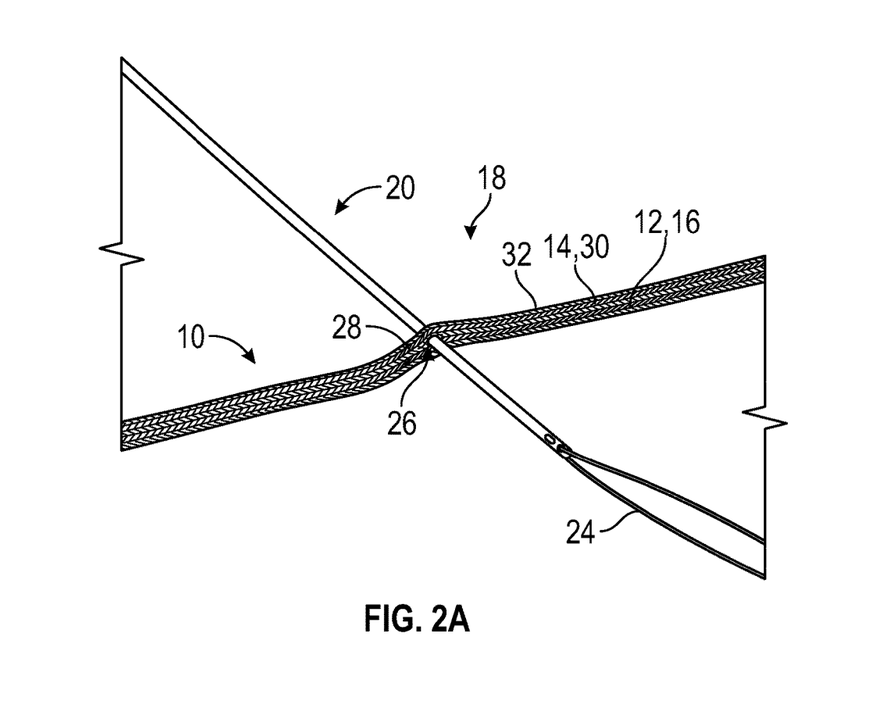
FIG. 2A is an enlarged view of the part of the suture pierced by the needle of FIG. 2.

FIGS. 2 and 2A show a system 18 that includes the suture 10 and a needle 20. The needle 20 can include a tip 22 (FIG. 2) and snare loop 24. The suture 10 can include an aperture 26, in addition to the body 12, exterior surface 14 and elongate strand 16.

The needle 20 can have an elongate length from the tip 22 at one end to the snare loop 24 at an opposing end. It is also contemplated that in alternative to a snare loop 24, the needle 20 could simply have an eye or other feature capable of capturing the suture 10 as known in the art. The tip 22 can be configured as a point can be configured to puncture the suture 10 as shown in FIGS. 2 and 2A. This puncture can create the aperture 26 as shown. The aperture 26 can be made at a first portion 28 of the elongate strand 16 of the body 12. The first portion 28 can be a part of the longitudinal length of the suture 10, for example. The aperture 26 can be formed in a manner that does not weaken the suture 10 such as by being positioned between the individual strands that make up the braids of the suture 10. Thus, the aperture 26 can be formed without breaking any of the strands that form the suture 10. The aperture 26 can pass in generally a lateral direction (give or take 60 degrees or so) through the elongate strand 16 relative to the longitudinal extent. The aperture 26 can be enclosed laterally on several sides by the body 12 of the suture 10. Thus, the aperture 26 can have only two openings. One opening of the aperture 26 can be on the first side of the suture and another opening can be on the second opposing side 32 of the suture. As the suture 10 shown in FIGS. 2 and 2A is a ribbon suture, the first side 30 and the second side 32 can be substantially flat and can be arranged generally opposing one another. The aperture 26 can pass through the body 12 from the first opening to the second opening or from the first side 30 to the opposing second side 32.

Figure 3:
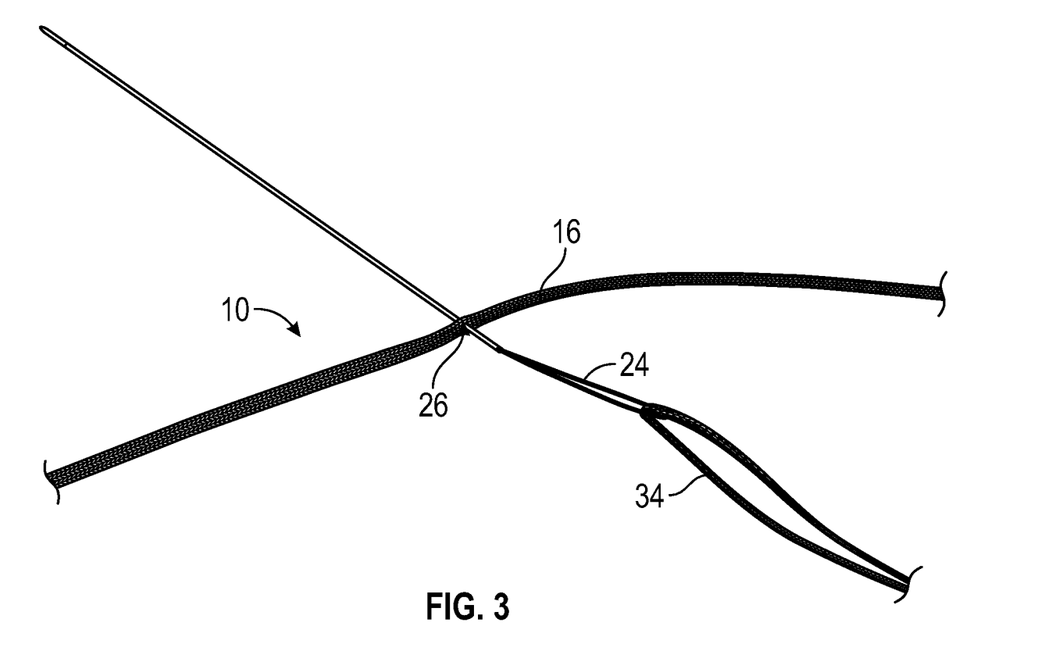
FIG. 3 illustrates part of the suture of FIG. 2 with a second part coupled to the needle according one example of the present disclosure.

FIG. 3 shows a second part 34 of the suture 10 from where the aperture 26 is located being captured by the snare loop 24. The second part 34 comprises a different portion of the same elongate strand 16 along a different part of the longitudinal length thereof.

Figure 4:
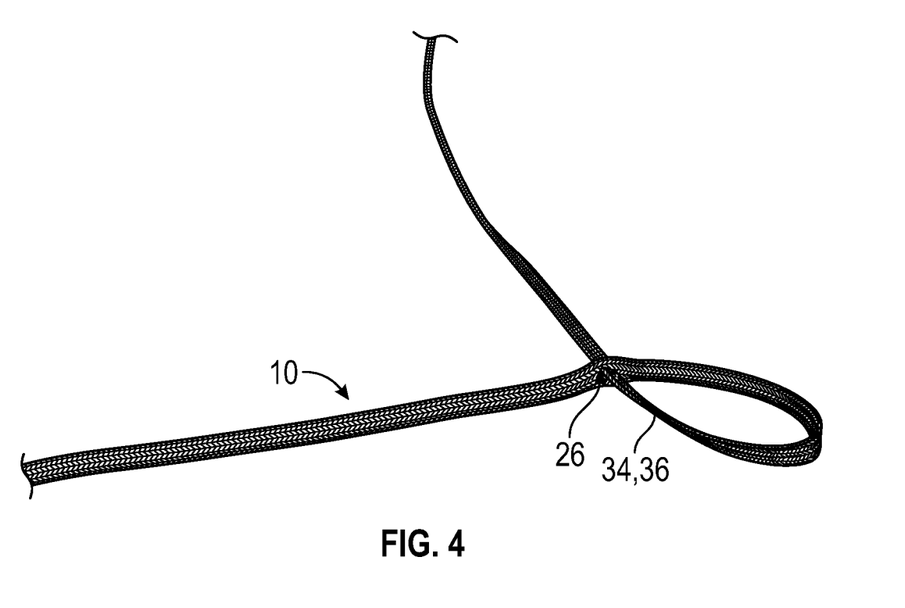
FIG. 4 illustrates the part of the suture passed through an aperture created by the needle so as to form a loop according to one example of the present disclosure.
Figure 5:
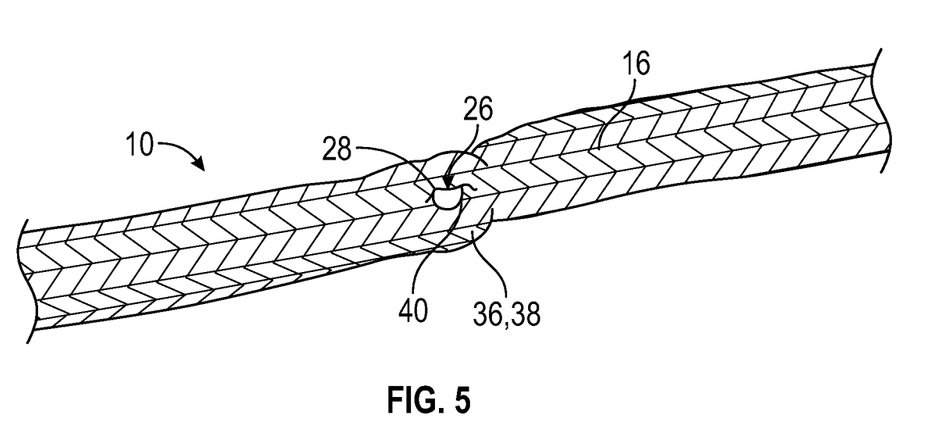
FIG. 5 illustrates the loop of FIG. 4 reduced to create a feature on a surface of the suture adjacent the aperture according to one example of the present disclosure.

FIG. 4 illustrates the second part 34 of the suture 10 now drawn by the snare loop 24 (FIG. 3) so as to be passed through the aperture 26. Thus, the suture 10 is passed through itself. This forms a loop 36 in the suture 10. Optionally, the loop 36 can be maintained and utilized for connection to another suture or for connection to a surgical device or another element, for example. However. FIG. 5 shows the loop 36 of FIG. 4 has be reduced by continuing to pull the second part 34 through the aperture 26 until loop 36 is closed (i.e., substantially eliminated) leaving a surface feature 38 along the surface 14 of the body 12 of the suture 10. This closed loop configuration passes a second portion 40 of the elongate strand 16 that is adjacent the first portion 28 through the aperture 26, thereby creating the surface feature 38. The surface feature 38 can comprise a bump, a ridge, a fold, a projection or the like. The surface feature 38 can be thought of as a folded portion of the suture 10 where the second portion 40 is folded over and passed through the first portion 28. The surface feature 38 can occur naturally as the loop 36 closes upon itself. The surface feature 38 can be U-shaped, omega shaped or otherwise shaped and can extend around several sides of the aperture 26. The aperture 26 can remain in some instances and shown in FIG. 4, However, in some cases the surface feature 38 can be large enough to obstruct or partially obstruct/cover the aperture 26 at least along the first side 30 of the suture 10. Indeed, as further discussed herein, an element such as a bead, knot or other mechanism can be utilized to enlarge the surface feature 38 to obstruct or substantially obstruct the aperture 26.

As discussed previously, the surface feature 38 can create an area of higher friction along the surface 14 of the suture 10 as compared with the remainder of the surface 14 not having the surface feature 38. This surface feature 38, with a higher degree of friction, can be used to better couple with tissue or better couple with the suture itself or other suture like a ratchet mechanism or zip tie, for example.

Figure 6:
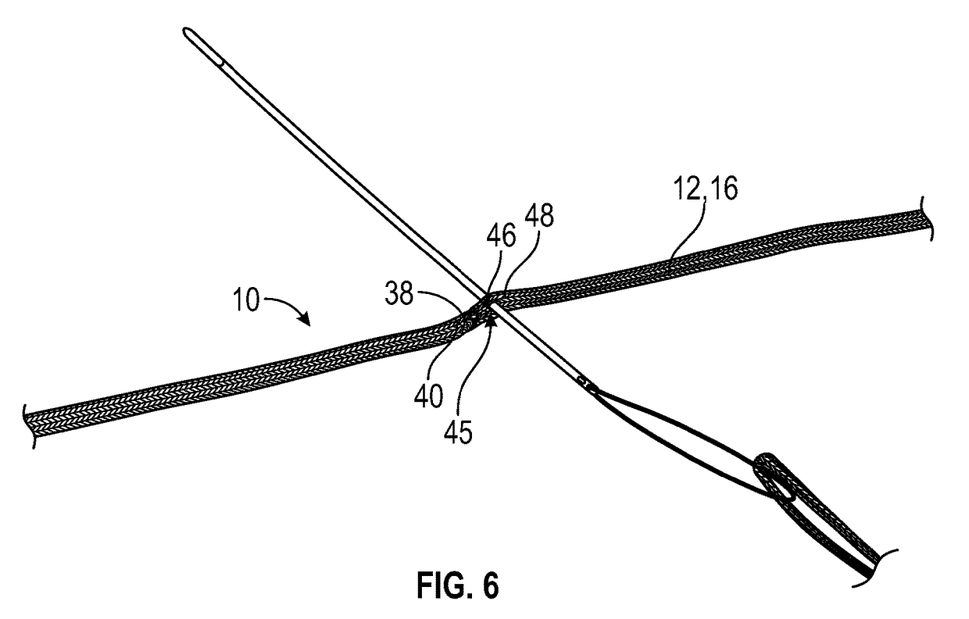
FIG. 6 illustrates a second aperture created by the needle adjacent the aperture of FIGS. 2-5 and the suture about to be passed through the second aperture as discussed in reference to FIGS. 3-5 according to one example of the present disclosure.
Figure 7:
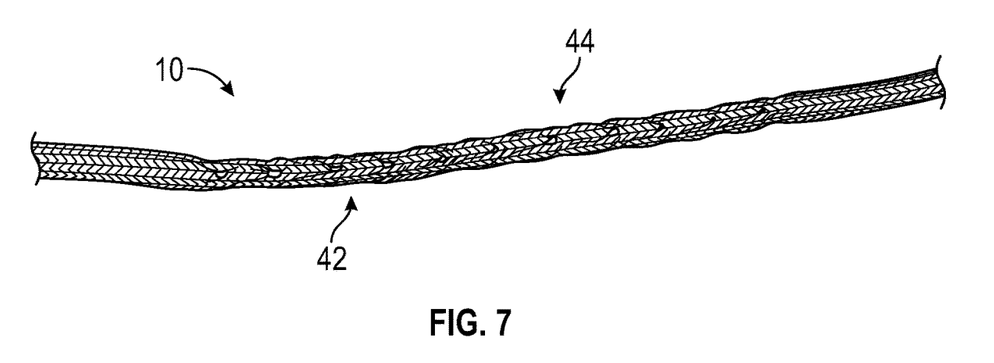
FIG. 7 illustrates a plurality of apertures including the first and second apertures and a plurality of features including the feature according to one example of the present disclosure.

FIGS. 6 and 7 show the methodology described in FIGS. 2-5 repeated on the suture 10 to create a plurality of the surface features 42 (FIG. 7) including the surface feature 38. These plurality of surface features 42 can create a region 44 of relatively higher degree of friction as shown in FIG. 7. This region 44 can have twists or turns of the suture between the plurality of features 42. As shown in FIG. 6, the body 12 can have at least a second aperture 45 therethrough at a third portion 46 of the elongate strand 16. The third portion 46 can be spaced longitudinally along the elongate strand 16 from the second portion 40. A fourth portion 48 of the elongate strand 16 adjacent the third portion 46 can be passed through the second aperture 45 to create at least a second feature along the surface of the body. This second feature is shown as one of the plurality of surface features 42 in FIG. 7.

FIGS. 8-11A show examples of various elements that can be captured by the suture using the techniques described above including passing a portion of the suture through an aperture in the suture. The elements contemplated can be anything known in the art for surgical closure that can be passed through or attached to a suture loop. Thus, the elements can include, but are not limited to: a bead(s), a knot(s), and/or a surgical device(s) (e.g., another suture(s), a ring, a hook, a suture anchor or the like).

Figure 8:
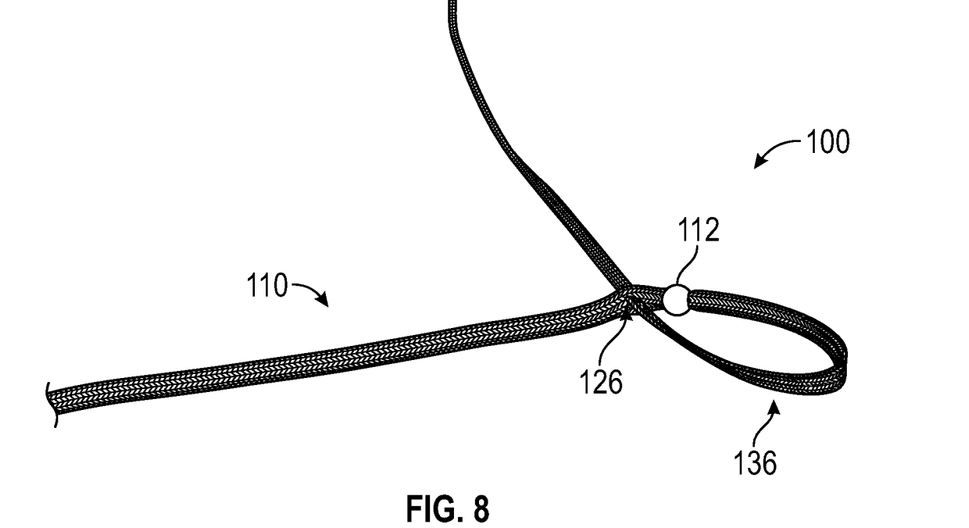
FIG. 8 illustrates a bead positioned in a loop created in the suture in a manner of FIG. 4 according to an example of the present application.
Figure 8A:
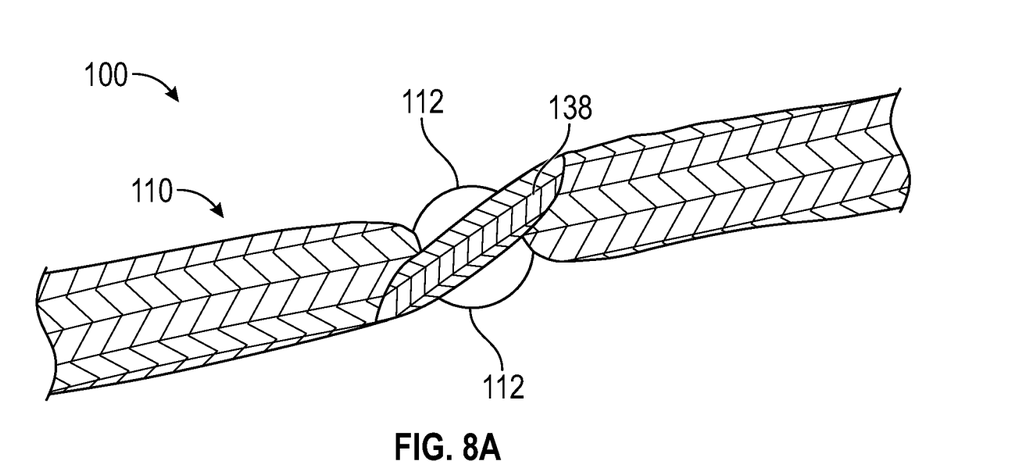
FIG. 8A illustrates the bead captured by a feature created when the loop is reduced according to an example of the present application.

FIGS. 8 and 8A show a system 100 according to another example that includes a suture 110 and a bead 112. The suture 110 can be constructed in the manner of the suture 10 previously discussed. FIG. 8 shows the suture 110 punctured in the manner previously described and a portion of the suture 110 passed through an aperture 126 therein. The bead 112 can be placed in a loop 136 formed by passing a portion of the suture 110 through the aperture 126. The bead 112 itself can have a passage or aperture therethrough that allows the suture 110 to pass through the bead 112. The loop 136 can be reduced in size until substantially eliminated in the manner previously described. This results in the suture 110 capturing the bead 112 as shown in FIG. 8A.

The bead 112 can be shaped to enlarge a surface feature 138 that results from reducing and substantially eliminating the loop 136. The surface feature 138 is shown in FIG. 8A. The increased size of the surface feature 138 that results from capturing the bead 112 can result in an area of increased friction along a surface 114 of the suture 110 relative to other area(s) of the surface 114. As discussed previously, the bead 112 can obstruct or partially obstruct the aperture 126 (FIG. 8).

Although the bead 112 of FIGS. 8 and 8A is shown as generally spherical in shape, other shapes are contemplated. For example, the bead 112 can have furrows or channels therein along the surface thereof rather than the passage therethrough as illustrate. These channels or furrows can be designed to receive portions of the suture 110. The bead 112 could be disk, flake, block or otherwise shaped if desired to facilitate different shapes for the surface feature 138.

Figure 9:
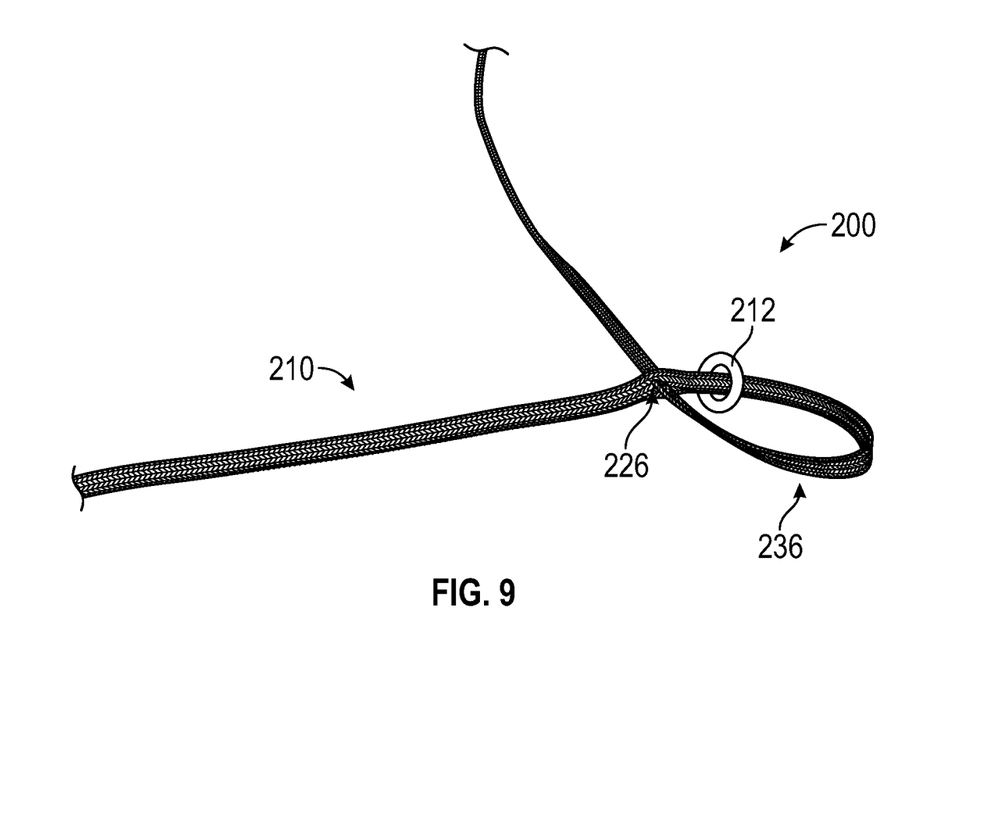
FIG. 9 illustrates a surgical device positioned in a loop created in the suture in a manner of FIG. 4 according to an example of the present application.
Figure 9A:
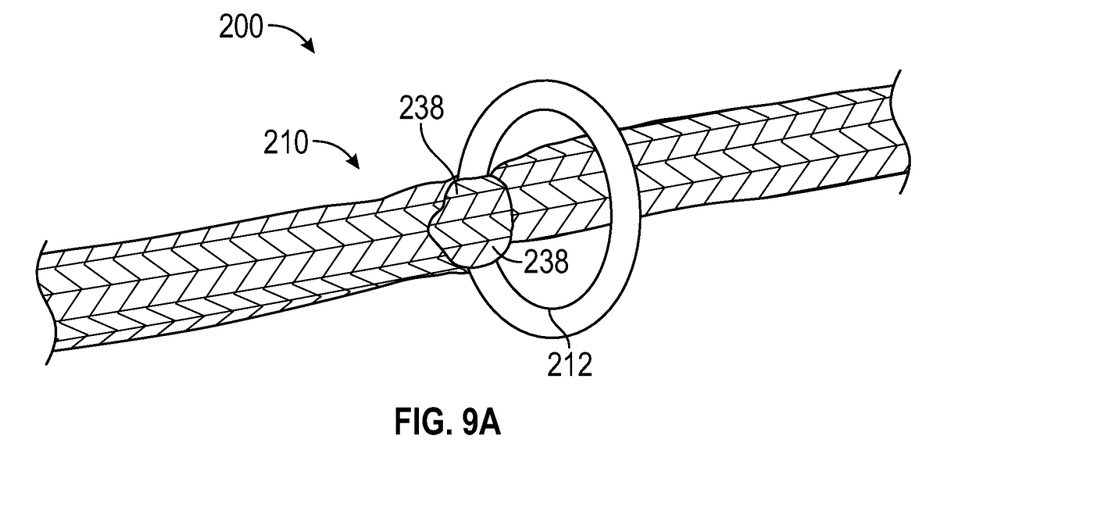
FIG. 9A illustrates the surgical device captured by a feature created when the loop is reduced according to an example of the present application.

FIGS. 9 and 9A show a system 200 according to another example that includes a suture 210 and a ring 212. The suture 210 can be constructed in the manner of the suture 10 previously discussed. FIG. 9 shows the suture 210 passed through the ring 212 and punctured in the manner previously described. A portion of the suture 210 can be passed through an aperture 226 therein. The ring 212 can be positioned in a loop 236 formed by passing a portion of the suture 210 through the aperture 226. The loop 236 can be reduced in size until substantially eliminated in the manner previously described. This results in the suture 210 capturing the ring 212 as shown in FIG. 9A.

The ring 212 can be shaped to provide a linkage whereby other surgical devices such as additional sutures, etc. can be coupled to the suture 210. The ring 212 can additionally enlarge a surface feature 238 that results from reducing and substantially eliminating the loop 236. The surface feature 238 is shown in FIG. 9A. The ring 212 can obstruct or partially obstruct the aperture 226 (FIG. 9).

Figure 10:
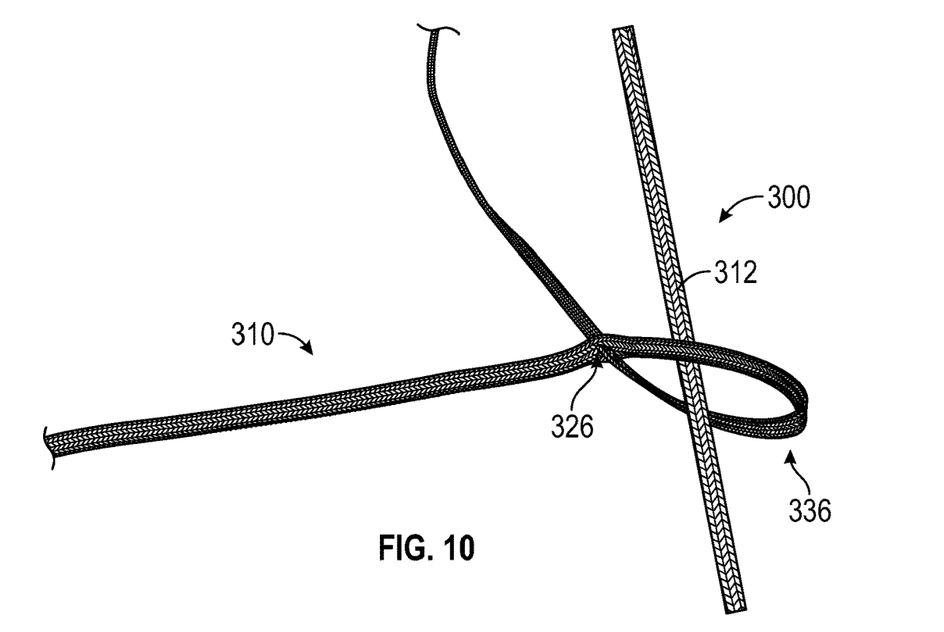
FIG. 10 illustrates a second surgical device positioned in a loop created in the suture in a manner of FIG. 4 according to an example of the present application.
Figure 10A:
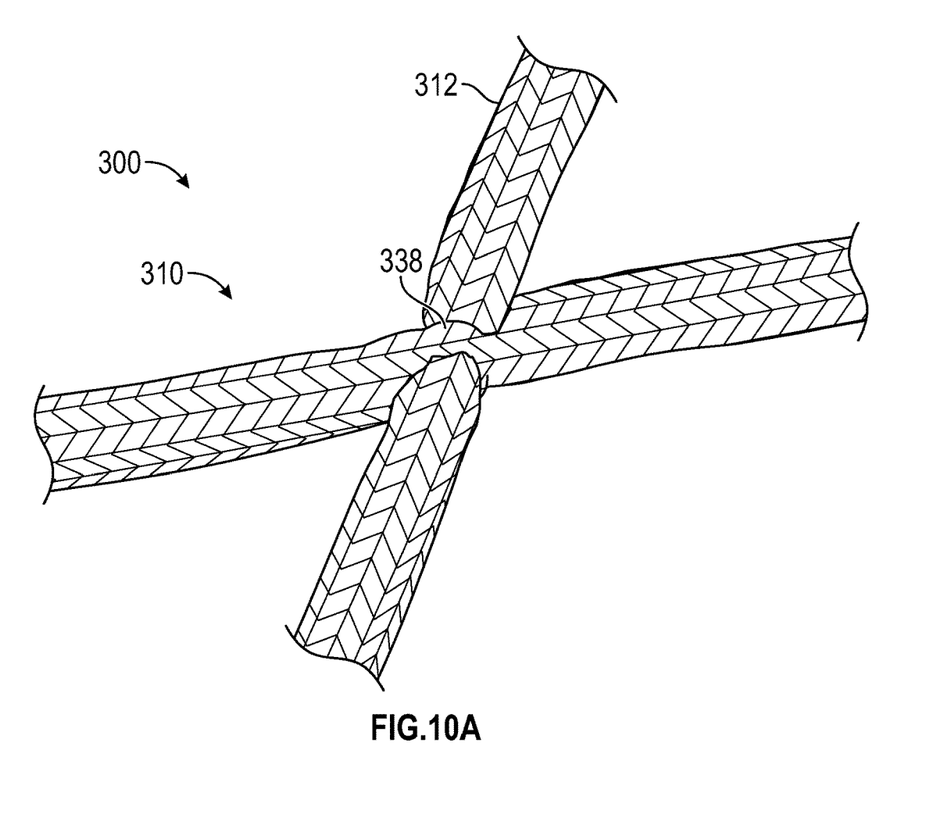
FIG. 10A illustrates the second surgical device captured by a feature created when the loop is reduced according to an example of the present application.

FIGS. 10 and 10A show a system 300 according to another example that includes a first suture 310 and a second suture 312. The first suture 310 and/or the second suture 312 can be constructed in the manner of the suture 10 previously discussed. The first suture 310 can have a same or different construction relative to one another. FIG. 10 shows the first suture 310 punctured in the manner previously described and a portion of the first suture 310 passed through an aperture 326 therein. The second suture 312 can be placed in a loop 336 formed by passing a portion of the first suture 310 through the aperture 326. The loop 336 can be reduced in size until substantially eliminated in the manner previously described. This results in the first suture 310 capturing the second suture 312 as shown in FIG. 10A.

The second suture 312 can provide an additional linkage to soft tissue and/or another surgical device such as an anchor. The second suture 312 can be provided with surface features such as those discussed herein (e.g., knots, loops, beads, etc.), which can help prevent the second suture 312 from slipping in the loop 336. The second suture 312 can additionally enlarge a surface feature 338 of the first suture 310 that results from reducing and substantially eliminating the loop 336. The surface feature 338 is shown in FIG. 10A. The second suture 312 can obstruct or partially obstruct the aperture 326 (FIG. 9) of the first suture 310.

Figure 11:
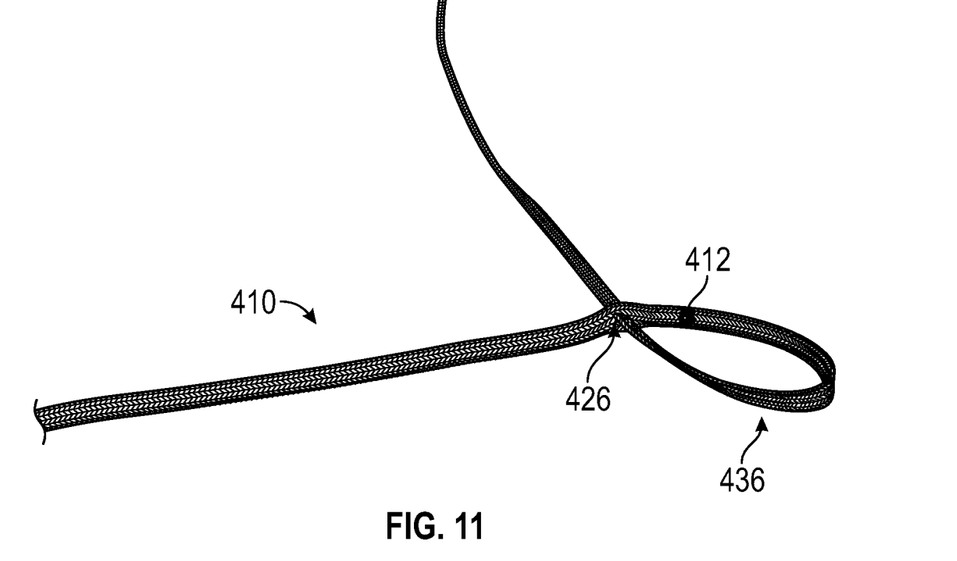
FIG. 11 illustrates a knot positioned in a loop created in the suture in a manner of FIG. 4 according to an example of the present application.
Figure 11A:
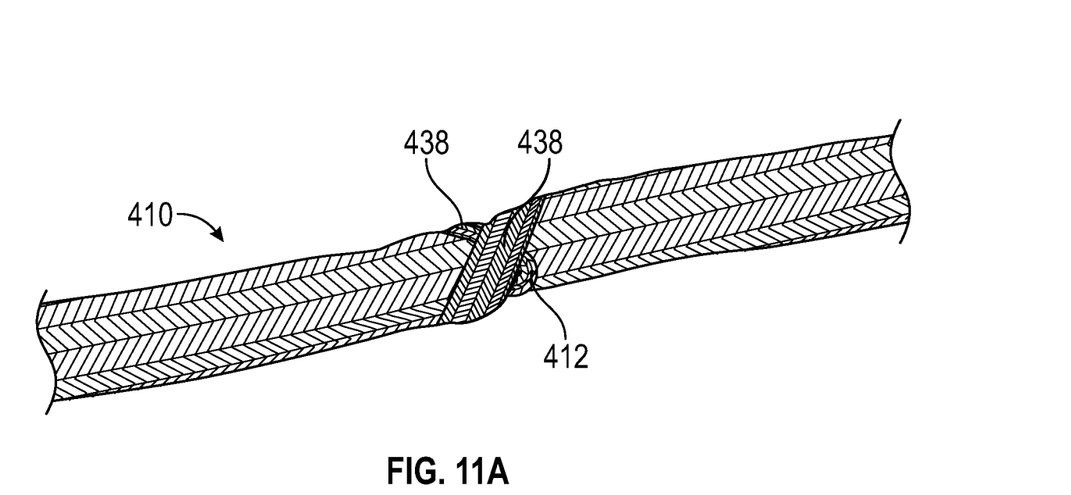
FIG. 11A illustrates the knot captured by a feature created when the loop is reduced according to an example of the present application.

FIGS. 11 and 11A show a suture 410 according to another example. The suture 410 can be constructed in the manner of the suture 10 previously discussed save that the suture 410 can include a knot 412 therein. FIG. 11 shows the suture 410 punctured in the manner previously described and a portion of the suture 410 passed through an aperture 426 therein. The knot 412 can be positioned so as to be placed in and form part of a loop 236 formed by passing a portion of the suture 410 through the aperture 426. The loop 436 can be reduced in size until substantially eliminated in the manner previously described. This results in the suture 410 folded over, capturing or otherwise positioning the knot 412 at or adjacent the aperture 426 as shown in FIG. 11A.

The knot 412 can be shaped in any manner known in the art. Thus, the shape of the knot is purely exemplary. The knot 412 can enlarge a surface feature 438 that results from reducing and substantially eliminating the loop 436. The surface feature 438 is shown in FIG. 11A. The increased size of the surface feature 438 that results from capturing, folding over or otherwise utilizing the knot 412 as part of the closed loop construct can result in an area of increased friction along a surface 414 of the suture 410 relative to other area(s) of the surface 414. As discussed previously, the knot 412 can obstruct or partially obstruct the aperture 426 (FIG. 11).

Figure 12:
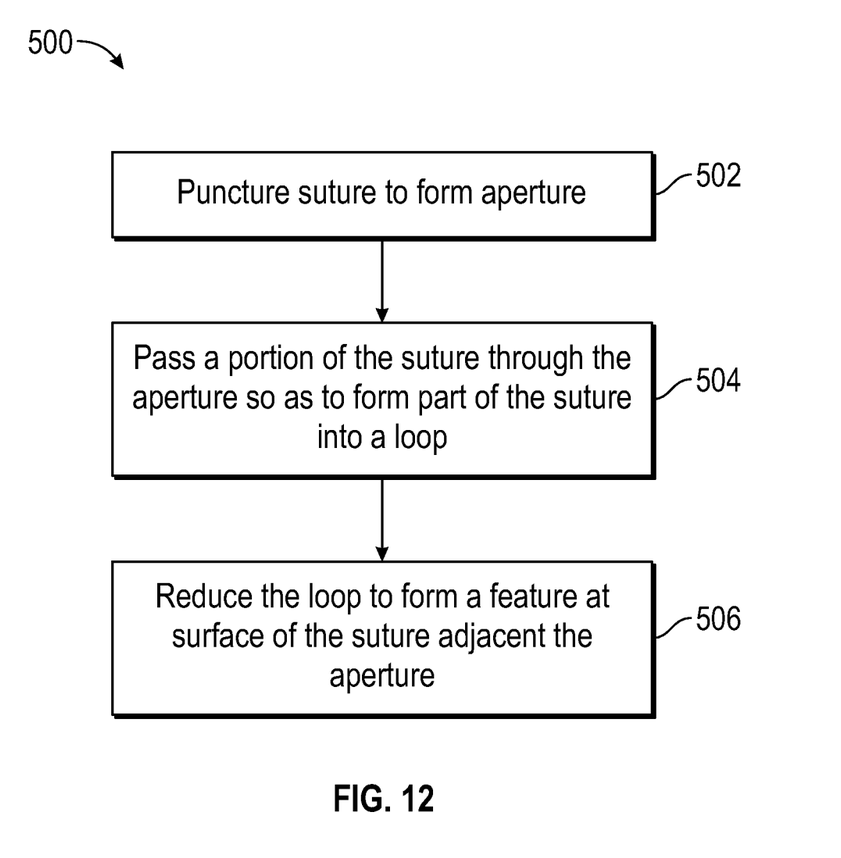
FIG. 12 shows a flowchart for a surgical method in accordance with at least one example of the present disclosure.

FIG. 12 shows a flowchart for a surgical or manufacturing method 500 in accordance with at least one example of the present disclosure. The method 500 can be utilized in a surgical procedure that utilizes various suture constructs, such as the suture constructs shown and described with respect to FIGS. 2-11A herein. However, the method 500 can also be used to fabricate OEM suture that can be sold and then utilized in a surgical procedure. The method 500 can include the step of puncturing 502 an elongate body of a suture to form an aperture. The method 500 can include passing 504 a portion of the elongate body through the aperture so as to form part of the elongate body into a loop. The passing the second portion of the elongate body through the aperture so as to form the elongate body into the loop can include capturing the suture in a snare loop that is passed through the aperture. The surgical method 500 can include reducing 506 the loop to form a ridge along a surface of the body adjacent the aperture.

The method 500 can optionally include creating a knot in the elongate body and capturing the knot within the loop with the reducing the loop. The method can include capturing an element within the loop with the reducing of the loop as previously described an illustrated. As discussed the element can comprise at least one of a knot, a bead, a surgical device or a second suture.

The various stages of method 500 have been described in a particular order for ease of discussion and completeness. However, the various stages of method 500 can be rearranged and/or omitted without departing from the scope of the present disclosure. The suture constructs and surgical methods disclosed herein can be modified without departing from the scope of the present disclosure.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." in this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to al low the reader to quickly ascertain the nature of the technical disclosure. It is submitted with the understanding that it will not be used to interpret or limit the scope or meaning of the claims. Also, in the above detailed description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the detailed description as examples or embodiments, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. A suture for a surgical procedure comprising;
   a body comprising an elongate strand, the body having a first aperture therethrough at a first portion of the elongate strand, wherein a second portion of the elongate strand adjacent the first portion is passed through the first aperture to form a loop, and wherein the loop is reduced until the loop is substantially eliminated to create a feature along an exterior surface of the body; and
   an element captured by the feature, wherein the element comprises at least one of a knot and a bead.

2. The suture of claim 1, wherein the body has at least a second aperture therethrough at a third portion of the elongate strand, wherein the third portion is spaced longitudinally along the elongate strand from the second portion, and wherein a fourth portion of the elongate strand adjacent the third portion is passed through the at least the second aperture to create at least a second feature along the exterior surface of the body.

3. The suture of claim 1, wherein the feature comprises a ridge along the exterior surface of the body.

4. The suture of claim 1, wherein the second portion is folded over and passed through at least a part of the first portion.

5. The suture of claim 1, wherein the body is formed of a plurality of braided strands that together form the elongate strand, and wherein the exterior surface of the body is substantially flat.

6. A system comprising:
   a suture having a body formed of an elongate strand, the body having a first aperture therethrough at a first portion of the elongate strand, wherein a second portion of the elongate strand adjacent the first portion is configured to pass through the first aperture to form a loop, and wherein the loop is reduced until the loop is substantially eliminated to create a feature along an exterior surface of the body;
   an element captured by the feature, wherein the element companies at least one of a knot and a bead; and
   a needle having a first end configured to puncture the suture to create the first aperture and a second part having a snare loop, eye or other feature configured to capture the suture, wherein the needle is configured to pass through the first aperture to pass the suture through the first aperture.

7. The system of claim 6, wherein the body has a plurality of apertures in addition to the first aperture, and wherein the suture is repeatedly passed through the plurality of apertures to form a plurality of features including the feature.

8. The system of claim 6, wherein the feature comprises a ridge along the exterior surface of the body.

9. The system of claim 6, wherein the second portion is folded over and passed through at least a part of the first portion.

10. A method of forming suture comprising:
    puncturing an elongate body of a suture to form an aperture therein;
    passing a portion of the elongate body through the aperture so as to form part of the elongate body into a loop;
    reducing the loop until the loop is substantially eliminated to form a feature along an exterior surface of the elongate body adjacent the aperture;
    one of creating a knot on the elongate body or providing a bead; and
    capturing the knot or bead within the loop with the reducing the loop.

11. The method of claim 10, wherein passing the portion of the elongate body through the aperture so as to form the elongate body into the loop includes capturing the suture in a snare loop, eye or other feature that is passed through the aperture.

* * * * *

UNITED STATES PATENT AND TRADEMARK OFFICE
CERTIFICATE OF CORRECTION

| | | |
|---|---|---|
| PATENT NO. | : 12,490,977 B2 | Page 1 of 1 |
| APPLICATION NO. | : 18/279551 | |
| DATED | : December 9, 2025 | |
| INVENTOR(S) | : Nguyen et al. | |

It is certified that error appears in the above-identified patent and that said Letters Patent is hereby corrected as shown below:

In the Claims

In Column 9, Line 38, In Claim 1, delete "comprising;" and insert --comprising:-- therefor In Column 10, Line 21, In Claim 6, delete "companies" and insert --comprises-- therefor Signed and Sealed this
Tenth Day of February, 2026

John A. Squires
*Director of the United States Patent and Trademark Office*